United States Patent [19]

McCoy et al.

[11] Patent Number: 4,759,126
[45] Date of Patent: Jul. 26, 1988

[54] KNIFE FOR DE-VEINING, PEELING AND BUTTERFLYING SHRIMP

[76] Inventors: John D. McCoy; Alex G. Dorsett, both of 927 Mercury, Houston, Tex. 77029

[21] Appl. No.: 64,767

[22] Filed: Jun. 19, 1987

[51] Int. Cl.⁴ .............................................. A22C 29/00
[52] U.S. Cl. ...................................... 30/120.1; 17/72; 30/355
[58] Field of Search ............... 30/120.1, 351, 355–357; 17/72, 73

[56] References Cited

U.S. PATENT DOCUMENTS 2,594,205  4/1952  Paoli .................................... 17/72 X
3,271,814  9/1966  Gorton ................................. 17/72 X
3,353,207  11/1967  Weinberger .................... 30/355 UX

*Primary Examiner*—Douglas D. Watts
*Attorney, Agent, or Firm*—Darryl M. Springs

[57] ABSTRACT

In one exemplar embodiment, a knife for de-veining, peeling and butterflying shrimp is disclosed having a handle and an elongated arcuate knife blade secured to the handle and extending forwardly thereof, the knife blade having an intermediate toothed blade portion disposed adjacent the handle and an arcuate blade portion extending forwardly of the intermediate toothed blade portion, the arcuate blade portion having a curvature approximating the body curvature of a de-headed shrimp. The arcuate blade portion has an upper convex cutting edge disposed thereon and a lower concave cutting edge adjacent the tip of the blade. The intermediate toothed blade portion has a plurality of spaced teeth aligned in a ramp configuration from front to rear adjacent the handle. When used, the knife tip is thrust through the body of a de-headed shrimp to slice the shrimp body along its longitudinal length to a depth traversed by the upper and lower cutting edges. The lower teeth of the intermediate toothed blade portion engage the shrimp vein in the visceral cavity and strip the vein from the shrimp body. The ramp-shaped intermediate toothed blade section also engages the shrimp shell to raise and loosen the shell from the shrimp body and then cleanly cut the shrimp shell longitudinally in alignment with the body slit created by the knife blade portion.

21 Claims, 2 Drawing Sheets

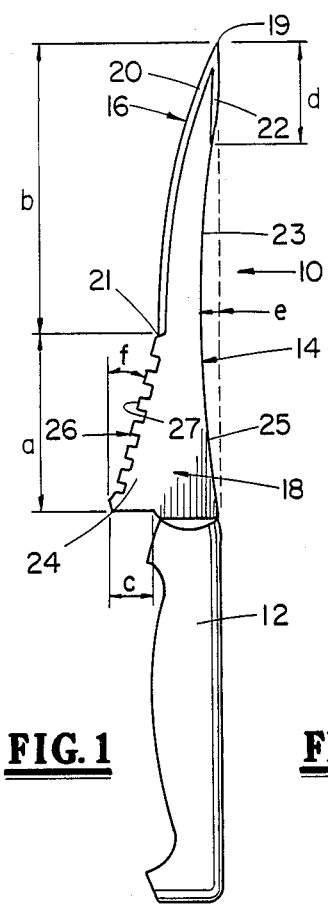 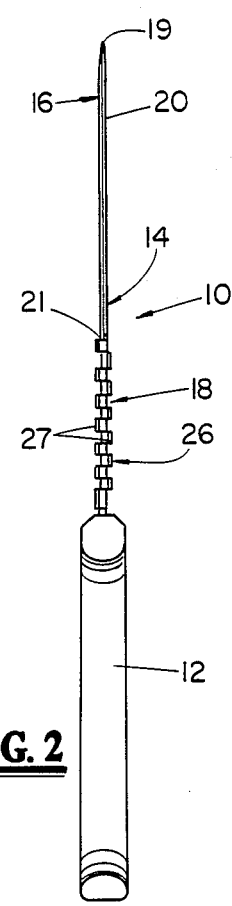 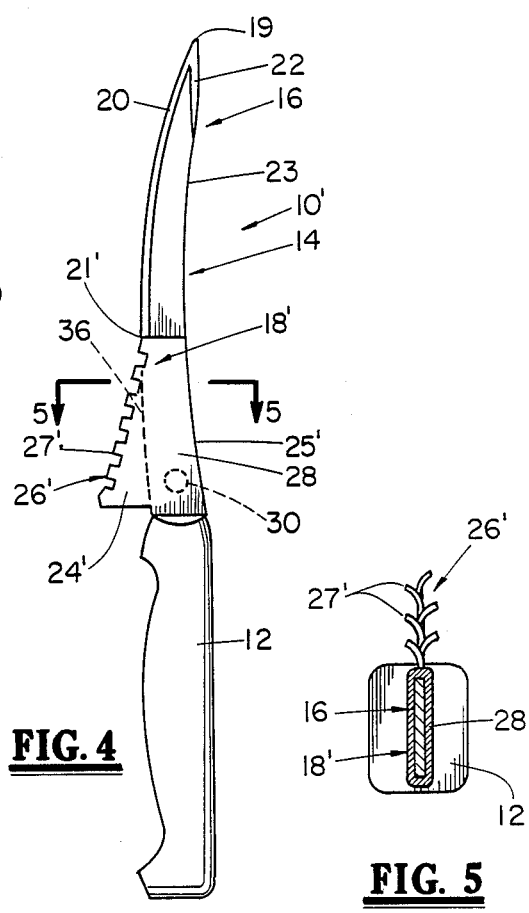 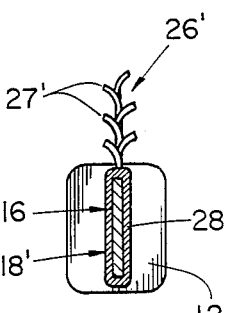 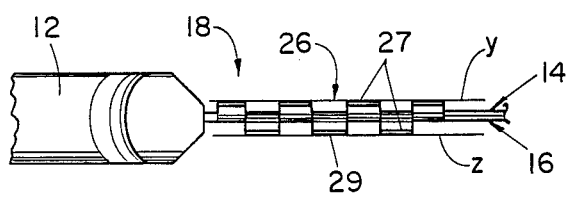 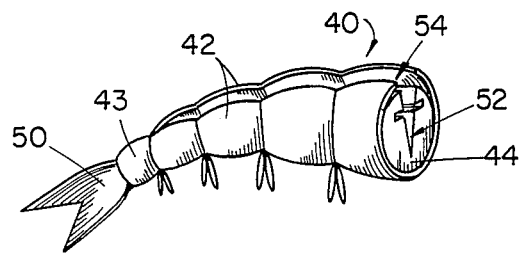 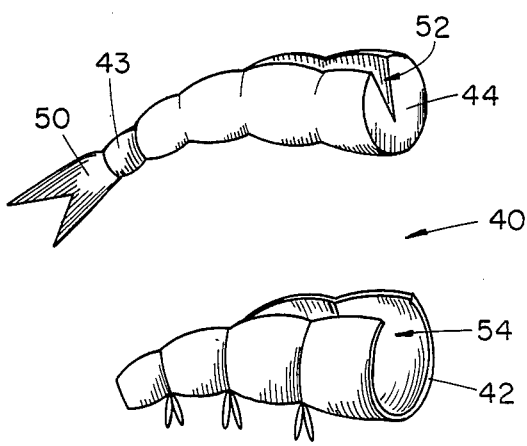

KNIFE FOR DE-VEINING, PEELING AND BUTTERFLYING SHRIMP

BACKGROUND OF THE INVENTION

This invention relates to knives and in particular a specialized knife for de-veining, peeling and butterflying a de-headed shrimp in the preparation for breading and frying.

In the seafood restaurant business, a popular seafood dish is fried shrimp, where the individual shrimp (usually a large or jumbo size) has been de-headed, de-veined and has had its outer shell removed except generally for the last small body shell segment and the attached tail portion. The latter are generally retained with the shrimp body to provide a "handle" for holding the shrimp during the food preparation stage and by a customer when eating the finished dish. After de-heading, de-veining and shell peeling, the shrimp body is then "butterflyed" or "slit" with a knife longitudinally and centrally down its back to a predetermined depth to permit the "halves" of the shrimp body to lay open and "flat" and assume the familiar "butterfly" shape of shrimp. The "butterflyed" shrimp is then coated with a selected seasoned batter and pan or deep fried to attain the popular "fried shrimp" seafood dish.

The preparation of the shrimp for frying as above described and using conventional implements is a labor intensive and time consuming process. The prior art discloses a shrimp peeling, de-veining and "butterflying" machine that will de-vein and remove the shell from the shrimp body mechanically, and "butterfly" the shrimp body in one operation. However, the peeling and de-veining machine is expensive to purchase (on the order of $500.00), and maintain, and if not carefully adjusted for the size of shrimp being processed, will damage the shrimp by making the "butterfly" cut too deep thus cutting the shrimp body in half or mangling a portion of the shrimp body. This damage to the shrimp body will often render the shrimp unusuable as "fried shrimp," thus wasting shrimp and adding greatly to the cost of the fried shrimp operation since the large or jumbo shrimp generally used are also the most expensive shrimp.

The shrimp can be de-headed, de-veined, shelled and "butterflyed" by hand, and tools to aid in this operation have been developed. An instrument for de-veining and shelling the shrimp is sold by the Slade Gorton Company and is disclosed in U.S. Pat. No. 2,561,359. The disclosed elongated tool is an integrally molded instrument for longitudinal insertion into the visceral cavity of a de-headed shrimp and has a set of saw teeth disposed thereon to engage the vein in the visceral cavity and remove the vein as the tool is thrust through the shrimp body. The tool also includes an inclined shoulder for engaging the shrimp shell and forcing it upwardly to split the shell along the underside of the body and force the shell away from the body along the top of the shrimp.

In other embodiments of the tool, molded integrally from plastic, the inclined shoulder also includes serrated spaced plastic teeth that do not have a sharp cutting edge. The inclined shoulder with integral plastic teeth help in splitting the top ridge of the shrimp body overlying the longitudinally disposed visceral cavity and occasionally sever a portion of the shell, but since the plastic teeth are not sharp, the teeth will not sever the tough shrimp shell segments along the back of the shrimp, but will generally only continue to tear the shrimp shell upwardly to separate the shell as disclosed in the above mentioned patent. Additionally, the tool often tears the shrimp shell along the sides or in several pieces, thereby making it more time consuming to remove the entire shell. However, although the shrimp has been de-veined and shelled or peeled, a separate "butterflying" operation must still be performed to prepare the shrimp for frying.

Since the de-veining, shelling, butterflying, and breading operations as performed by hand are labor intensive and costly, and a restaurant often cannot afford the luxury of an expensive processing machine unless the restaurant can process an extremely large quantity of shrimp for frying, many restaurants have opted for discontinuing "butterflying" the shrimp and frying them "whole" (de-headed, de-veined and peeled) or have discontinued serving fried shrimp altogether, because of the high cost of processing. For example, the labor cost to process 50 pounds of #31-35 size shrimp (31-35 fresh de-headed shrimp per pound) by hand, using conventional de-veining and shelling tools, and then separately "butterflying" the shrimp body and breading the shrimp for frying (excluding the original cost of the shrimp) can typically run approximately $2.75 per pound including losing 3 to 5 pounds due to breakage.

However, utilizing the knife invention disclosed herein, a de-headed shrimp in its shell can be de-veined, peeled, and "butterflyed" in one simple manual operation thus effecting a dramatic savings in labor cost in preparing the shrimp. Using the de-veining, peeling and butterflying knife herein disclosed, it is possible to routinely reduce the preparation costs of size #31-35 shrimp through the breading step by one-half to two-thirds, or down to about $0.90 per pound and reduce the wastage rae to less than one-half pound or so. In addition, a skilled operator using the knife can prepare a better and more asthetic shrimp product and greatly reduce the damaged shrimp and wastage. This dramatic savings in labor costs and reduction of wastage will greatly enhance the restaurant's profit margin, and in many cases, make the serving of "butterflyed" fried shrimp profitable again.

Accordingly, one primary feature of the present invention is to provide a knife for de-veining, peeling and "butterflying" shrimp that is simple to use and can accomplish the operations in a single maneuver.

Another feature of the present invention is to provide a knife for de-veining, peeling and "butterflying" shrimp that is inexpensive and affordable by all restaurants intending to serve fried shrimp.

Yet another feature of the present invention is to provide a knife for de-veining, peeling and "butterflying" shrimp that will cut through the hard shell segments down the back of the shrimp in alignment with the "butterflying" slit in the shrimp body to enable the shell to be easily removed from the shrimp body.

Still another feature of the present invention is to provide a knife for de-veining, peeling and "butterflying" shrimp that is simple and easy to use and will prevent unintentional damage to the shrimp body thus saving wastage of expensive frying shrimp.

Yet another feature of the present invention is to provide a knife for de-veining, peeling and "butterflying" shrimp that can reduce the labor costs of preparing the shrimp for frying in the range of 50% to 65% over conventional multiple hand operations.

Another feature of the present invention is to provide a knife for de-veining, peeling and "butterflying" shrimp that breaks the outer shrimp shell segments along the back of the shrimp away from the shrimp body for aiding in shell removal and peeling.

Still another feature of the present invention is to provide a knife for de-veining, peeling and "butterflying" shrimp that is safe to use since the knife blade never cuts toward the hand or body of the person using the knife.

SUMMARY OF THE INVENTION

In accordance with one primary principle of this invention, a knife for de-veining, peeling and butterflying shrimp is disclosed that comprises a handle, and an elongated knife blade secured to said handle and extending forwardly thereof, the elongated knife blade having a generally flat-sided configuration and including an intermediate toothed blade portion disposed immediately adjacent the handle, the elongated knife blade further including an arcuate blade portion integrally extending forwardly of the intermediate toothed blade portion and tapering from the junction with the intermediate toothed blade portion to a pointed tip free end, the arcuate curvature approximating the body curvature of a de-headed shrimp, the arcuate blade portion having a first continuous cutting edge disposed along the entire upper convex length of the blade between the intermediate toothed blade portion and the knife tip, and a second cutting edge disposed along a portion of the lower concave length of the blade and immediately adjacent the knife tip and communicating therewith, the length of the second cutting edge being substantially shorter than the first cutting edge portion, the intermediate toothed blade portion having an arcuate lower edge smoothly interconnecting the arcuate lower edge of the blade portion and the handle, the intermediate toothed blade portion having an upper edge upwardly inclined from the arcuate blade portion toward the handle, the upwardly inclined edge carrying a plurality of cutting teeth the outer edge of each of which are slanted in general conformance with the upwardly inclined edge and having generally straight knife cutting edges disposed thereon, each of the cutting teeth being angled laterally away from the longitudinal plane of the elongated knife blade in an alternating relationship.

In accordance with another principle of the invention, the knife blade is adapted to longitudinally penetrate the body of the de-headed shrimp, with the knife tip insertable below the visceral cavity at the exposed de-headed end, and to exit the shrimp body at a predetermined point adjacent the tail for permitting the upper and lower cutting edges of the arcuate blade portion to vertically slit the shrimp body in the shell through the visceral cavity along the path of the arcuate blade portion to a depth determined by the depth traversed by the lower cutting edge, the lowermost teeth of the inclined cutting teeth of the intermediate toothed blade portion passing through the upper portion of the slit in the shrimp body and engaging the vein in the visceral cavity, the inclined cutting teeth further engaging the shell above the vertical slit in the shrimp body for slightly raising the shell and separating the shell from the shrimp body and then longitudinally cutting the shell segments in alignment with the longitudinal vertical slit made in the shrimp body and removing the vein from the visceral cavity of the shrimp body as the intermediate toothed blade portion passes through the vertical slit.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the accompanying drawings, which drawings form a part of this specification. In the drawings:

FIG. 1 is a side view of one embodiment of the knife wherein the intermediate toothed blade portion is integral with said knife blade.

FIGS. 2, 3 are top views of the embodiment of the knife shown in FIG. 1.

FIG. 4 is a side view of another embodiment of the knife wherein the intermediate toothed blade portion is seprately constructed and fitted over the knife blade.

FIG. 5 is a vertical cross-sectional view of the knife taken along lines 4—4 of FIG. 3.

FIG. 7 is a pictorial view showing a shrimp that has been longitudinally cut and de-veined with the knife, and still retaining its longitudinally cut shell.

FIG. 8 is a pictorial view showing the longitudinally cut shell removed from the longitudinally sliced shrimp body.

DETAILED DESCRIPTION OF THE INVENTION

Figure 6A:
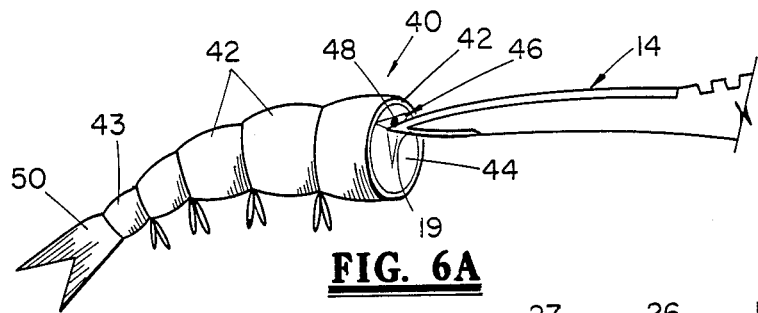
FIGS. 6A–6D are pictorial views showing the sequence of using the knife to de-vein, peel and butterfly a de-headed shrimp.

Referring now to FIGS. 1 and 2, one embodiment of the knife 10 for de-veining, peeling and butterflying de-headed shrimp is shown comprising a handle 12 and an elongated arcuate knife blade 14 having a generally flat-sided configuration and secured to the handle 12 and extending forwardly thereof. The knife blade 14 includes an intermediate toothed blade portion 18 (see dimension a) disposed immediately adjacent the handle 12, and an arcuate blade portion 16 (see dimension b) integrally extending forwardly of said intermediate toothed blade portion 18. The arcuate blade portion 16 tapers from the junction with the intermediate toothed blade portion 18 to a pointed tip free end 19. The curvature of the arcuate blade portion 16 approximates the natural curvature of a shrimp body.

The arcuate blade portion 16 has a continuous cutting edge 20 disposed along the entire upper convex length of the blade between the junction with the intermediate toothed blade portion 18 at 21 and the knife blade tip 19 (see dimension b). The arcuate blade portion 16 also has a cutting edge 22 disposed along a portion (dimension d) of the lower concave length 23 of the knife blade 14 and disposed immediately adjacent the blade tip 19. The lower cutting edge 22 communicates with the upper cutting edge 20 at tip 19. As can be seen, the straight extending length of the arcuate blade portion 16 is shown by the dimension b, and as may be seen, the arcuate length of the lower second cutting edge 22 is substantially shorter than the arcuate length of the upper first cutting edge 20, and the length of the arcuate blade portion 16 is long as compared to the length of the toothed knife portion 18, shown at dimension a.

In the preferred embodiment, a knife designed for de-veining and butterflying large #31-35 shrimp (31-35 shrimp per pound) or larger, the overall knife blade dimension (dimension a plus dimension b) has been found to be conveniently about 5¼ inches, with the length of the arcuate blade portion 16 (dimension b) being about 3¼ inches, while the intermediate toothed blade portion 18 (dimension a) is approximately 2.0 inches. If the length of the handle 12 is conveniently found to be approximately 4¼ inches, the overall length of the knife 10 is approximately 9½ inches. The length of the lower cutting edge 22 is shown to extend approximately 1.0 inch (see dimension d) from the tip 19. Of course, for other sizes of shrimp, it may be preferable to vary the dimensions above described since the dimensions and weight of the knife are important to the speed of the process and the quality of the final product.

The intermediate toothed blade portion 18 has an arcuate lower edge 25 that smoothly interconnects the lower arcuate edge of the knife blade 23 and extends to the handle 12. The edge portions 23 and 25 generally form a shallow arcuate curve. If a line (see the dotted line in FIG. 1) is drawn longitudinally between the handle 12 and the tip 19 and tangent to the lower edge thereof, a chord of a circle is generally formed with relation to the handle of the knife. The maximum height of the chord is shown at e and is approximately 5/16 inches in the preferred embodiment above described.

The intermediate blade portion 18 has an upper edge that defines an upwardly angled inclined surface 26, slanting upwardly and rearwardly from the junction 21 with the arcuate blade portion 16, toward the handle 12. The inclined surfaced or edge 26 of the intermediate toothed blade portion 18 carries a plurality of cutting teeth 27, the outer edges of each of which are generally straight and define the inclined edge or surface 26. Each of the cutting teeth 27 has a generally straight knife cutting edge 29 and are bent or angled laterally from the plane of the knife blade 14 (see FIG. 2) to "offset" the teeth therefrom. Each of the teeth 27 is alternately offset above and below the plane of the knife blade 14 to form two generally parallel rows of alternately offset teeth 27, as may be seen more specifically in FIG. 3 as parallel rows defined by lines y and z offset from the plane of the knife blade 14.

For the knife generally dimensioned as hereinabove described, the maximum rise of the inclined surface 26 above the upper edge 20 of the knife blade 14 is in the range of ½ to ¾ inches as shown by dimension c. The preferred angle f of the inclined surface 26 is preferably about 30° from the horizontal, but may have a range of about 30° to 45° from the horizontal. It has been found that for the #31-35 or larger shrimp, with the knife generally dimensioned as hereinabove described, the preferred number of teeth 27 is 4-5 per inch. However, it is apparent that the knife 10 dimensions as heretofore described may be varied to scale the knife up or down for larger shrimp or prawns or for smaller shrimp as the need arises without departing from the invention herein disclosed.

An alternate embodiment of the knife 10' for de-veining, peeling and butterflying de-headed shrimp is shown in FIGS. 4 and 5. The alternate embodiment of the knife 10' is comprised of a handle 10 and an arcuate knife blade 14 secured to the handle and arcuately extending forwardly therefrom. The knife blade 14' is similar in construction to blade 14, shown in the first embodiment disclosed in FIGS. 1 and 2, and includes an identical arcuate blade portion 16, but has a narrower shank portion 36 integrally interconnecting the arcuate blade portion 16 with the handle 12.

However, in this embodiment, the intermediate toothed blade section 18' comprises a "sleeve" section 28 that may be removably slipped on and off over the arcuate blade portion 16 and held in place about the blade narrower shank portion 36 by a close friction fit or held permanently by a securing means such as a rivet, spot weld or adjustable set screw 30. The details of the projecting inclined portion 24', as well as the cutting teeth 27' are identical to those already described above for the embodiment shown in FIGS. 1 and 2, and therefore will not be further described. Similarly, the details of the construction and configuration of the arcuate blade portion 16 are identical to those above described for the first embodiment and will not be further described.

Figure 6B:
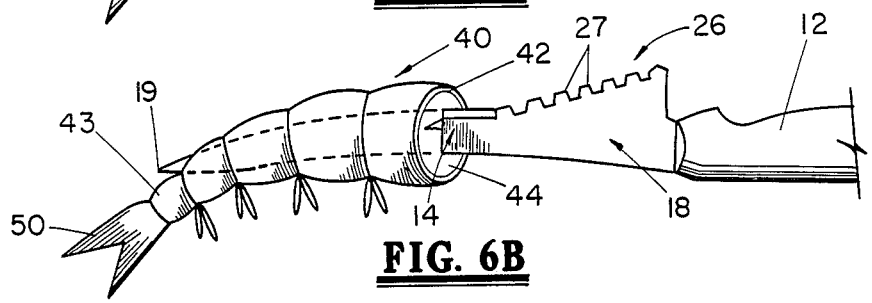
Figure 6C:
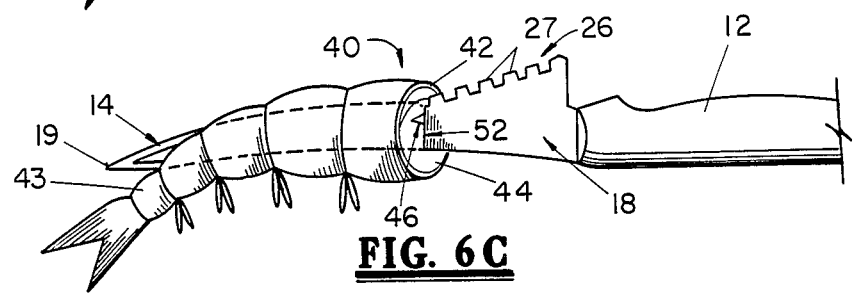

Referring now to FIGS. 6A-6D and 7-9, the use and function of the knife 10 will be explained in greater detail. A large shrimp 40 is shown having a plurality of large shell segments 42, and a small shell segment 43 adjacent to and connected to the tail portion 50. At the de-headed end, the exposed shrimp body or flesh 44 is shown, including the visceral cavity 46 and the exposed end of the vein 48. When using the knife 10, the large shrimp 10 is straightened out in the palm of the left hand and held firmly between the thumb and forefinger, causing the shrimp to assume its slightly curved body shape. With the right hand, the pointed tip 19 of the knife 10 is inserted longitudinally into the central portion of the de-headed end of the shrimp 40 below the visceral cavity 46 and the vein 48 (see FIG. 6A). The arcuate blade portion 16 is then carefully thrust and guided longitudinally through the shrimp body 44 to a desired depth and then the tip 19 is threaded through the shrimp shell to exit between adjacent shell segments 42 and 43 as shown in FIG. 6B. When the knife 10 is manipulated as shown in FIGS. 6A and 6B, the upper and lower cutting edges, 20 and 22 respectively, vertically slit the shrimp body portion 44 in the shell 42 along the path of the arcuate blade portion 16 to a depth determined by the depth traversed by the lower cutting edge 22.

Figure 6D:
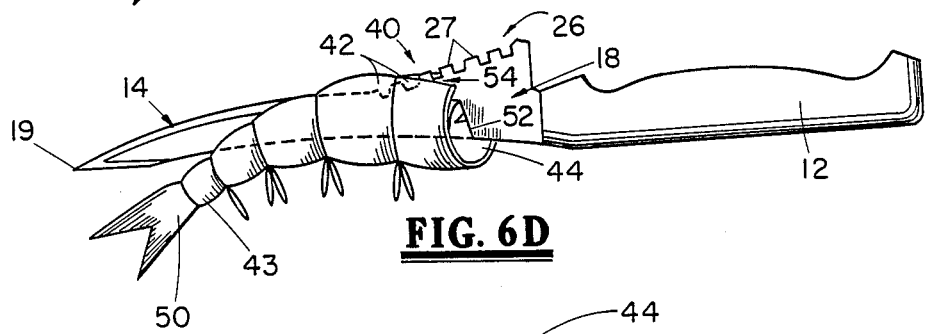
Figure 9:
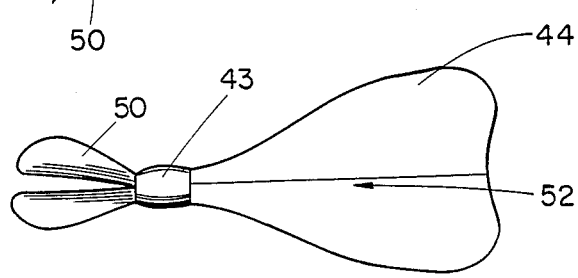
FIG. 9 is a pictorial view showing the de-veined, peeled and butterfly-cut shrimp body laid open ready for breading.

As the arcuate body portion 16 of the knife blade 14 continues to be inserted through the shrimp body 44, the first lower cutting teeth 27, travelling in the body slit 52 created by the pair of cutting edges 20 and 22, will enter the visceral cavity 46 and engage the vein 48. As the cutting teeth 27 continue into the slit 52 in the shrimp body 44, the inclined surface 26 and the cutting teeth 27 will contact the shell 42, raise it up slightly and separate it from the body portion 44 (see FIG. 6C). As the knife is further urged through the shrimp 40, continued pressure by the inclined rows of cutting teeth 27 will cut cleanly through the shell longitudinally along the back of the shrimp at 54 in vertical alignment with the longitudinal vertical slit 52 made in the shrimp body 44 as above described and as shown in FIG. 6D. As the inclined cutting teeth 27 traverse the shrimp body slit 52 and the visceral cavity 46 (as hereinabove described), the engaged vein 48 is "snagged" by the double rows of offset cutting teeth 27 and stripped from the visceral cavity. If the knife 10 is smoothly thrust through the shrimp body as hereinabove described, the cutting teeth 27 will raise the shell 42 from the shrimp body and cleanly slit the shell along the line 54 as hereinabove described until the point is reached where the knife orignially protruded from the shrimp adjacent small shell segment 43.

Upon complete traverse of the knife 10 through the shrimp body 44 and shell 42, the shrimp 40 will appear as shown in FIG. 7, with the shrimp body 44 still in the shell 42, but with the body containing a vertical slit 52 loosened throughout its longitudinal length to the shell segment 43 and with a corresponding longitudinal cut or slit 54 in the shell segments 42 in vertical alignment with the body slit 52 as shown. In FIG. 8, the loosened longitudinally severed shrimp shell segments 42 have been stripped or separated from the fleshy body portion 44 of the shrimp 40, with the last shell segment 43 and tail 50 being retained on the shrimp body 44. The shrimp body portion 44 may now be spread apart along the longitudinal slit 52 to form the familiar "butterfly" shape (see FIG. 9) for breading and frying in the conventional manner.

For convenience and ascetic purposes, the last shell segment 43 and the tail are generally retained on the shrimp body 44 for handling the shrimp during breading and frying and to enable the customer to eat the fried "butterflyed" shrimp by grasping the tail portion 50. As may be seen, the use of the knife 10 enables a food preparation worker to de-vein, peel and "butterfly" a de-headed shrimp in a single manipulative operation of the knife. It should further be noted that the cutting dges 20 and 22 of the knife blade 14 are thrust laterally through the shrimp body and never have to be manipulated towards the operator's body or hands, thus greatly enhancing safety when preparing the shrimp.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

We claim:

1. A knife for de-veining, peeling and butterflying a de-headed shrimp, comprising
   a handle, and
   an elongated knife blade secured to said handle and extending forwardly thereof,
   said elongated knife blade having a generally flat-sided configuration and including an intermediate toothed blade portion disposed immediately adjacent said handle, said elongated knife blade further including an arcuate blade portion integrally extending forwardly of said intermediate toothed blade portion and tapering from the junction with said intermediate toothed blade portion to a pointed tip free end, said arcuate curvature approximating the body curvature of a de-headed shrimp, said arcuate blade portion having a first continuous cutting edge disposed along the upper convex length of said blade between said intermediate toothed blade portion and said knife tip and a second cutting edge disposed along a portion of the lower concave length of said blade and immediately adjacent said knife tip and communicating therewith, said intermediate toothed blade portion having an upper edge defining an upwardly inclined ramp extending from said arcuate blade portion toward said handle, said upwardly inclined edge carrying a plurality of cutting teeth that have generally straight knife cutting-edges disposed thereon, each of said cutting teeth being alternately angled away from the plane of said elongated knife blade,
   wherein said knife blade is adapted to longitudinally penetrate the body of the de-headed shrimp with the knife tip insertable below the visceral cavity at the exposed de-headed end and exiting the shrimp body at a predetermined point for permitting said first and second arcuate cutting edges of said arcuate blade portion to vertically slit the shrimp body through the visceral cavity along the path of said arcuate blade portion to a depth determined by the depth traversed by said lower second cutting edge, the lowermost teeth of said inclined intermediate toothed blade portion passing through said upper portion of said slit in said shrimp body and engaging and removing the vein in said visceral cavity as said toothed blade portion passes therethrough, said inclined cutting teeth further engaging the shell above said vertical slit in the shrimp body for raising and separating the shell from the shrimp body and then longitudinally cutting the shell in alignment with the longitudinal vertical slit made in the shrimp body by said knife blade for facilitating easy removal of the shell from the shrimp body.

2. The knife as described in claim 1, wherein said intermediate toothed blade portion is integral with said knife blade and lies in the plane of said knife blade.

3. The knife as described in claim 1, wherein said intermediate toothed blade portion is a separate piece overlying said knife blade adjacent said handle.

4. The knife as described in claim 3, wherein said intermediate toothed blade portion includes a sleeve section having an aperture therethrough for insertion over said knife blade and positionable thereon adjacent said handle, and means for retaining said removable intermediate toothed blade portin on said knife blade adjacent said handle.

5. The knife as described in claim 4, wherein said retaining means comprises a permanent means of mounting said sleeve section to said knife blade.

6. The knife as described in claim 5, wherein said permanent retaining means comprises a rivet disposed laterally through said sleeve section and said knife blade.

7. The knife as described in claim 4, wherein said retaining means comprises releasable means of mounting said sleeve section on said knife blade to faciliate removal of said sleeve section.

8. The knife as described in claim 7, wherein said releasable means comprises a snug friction fit of said sleeve section with respect to said knife blade.

9. The knife as described in claim 7, wherein said releasable means comprises a set screw disposed in said sleeve section for releasably engaging said knife blade.

10. The knife as described in claim 1, wherein the length of said second cutting edge portion of said knife blade is shorter than said first cutting edge portion.

11. The knife as described in claim 1, wherein the rear-most end of said intermediate toothed blade portion projects above the level of said handle.

12. The knife as described in claim 1, wherein said intermediate toothed blade portion has a lower edge smoothly interconnecting said lower edge of said arcuate blade portion and said handle.

13. A knife for de-veining, peeling and butterflying a de-headed shrimp, comprising a handle, and an elongated knife blade secured to said handle and extending forwardly thereof, said elongated knife blade having a generally flat-sided configuration and including an intermediate toothed blade portion disposed immediately adjacent said handle and lying in the plane of said knife blade, said elongated knife blade further including an arcuate blade portion integrally extending forwardly of said intermediate toothed blade portion and tapering from the junction with said intermediate toothed blade portion to a pointed tip free end, said arcuate curvature approximating the body curvature of a de-headed shrimp, said arcuate blade portion having a first continuous cutting edge disposed along the upper convex length of said blade between said intermediate toothed blade portion and said knife tip and a second cutting edge disposed along a portion of the lower concave length of said blade and immediately adjacent said knife tip and communicating therewith, the length of said second cutting edge portion being shorter than said first cutting edge portion, said intermediate toothed blade portion having a lower edge smoothly interconnecting said arcuate lower edge of said arcuate blade portion and said handle, said intermediate toothed blade portion having an upper edge defining an upwardly inclined ramp from said arcuate blade portion toward said handle with the rearmost portion of said ramp projecting above said handle, said upwardly inclined edge carrying a plurality of cutting teeth that have generally straight knife cutting-edges disposed thereon, each of said cutting teeth being alternately angled away from the plane of said elongated knife blade, wherein said knife blade is adapted to longitudinally penetrate the body of the de-headed shrimp with the knife tip insertable below the visceral cavity at the exposed de-headed end and exiting the shrimp body at the predetermined point for permitting said first and second cutting edges of said arcuate blade portion to vertically slit the shrimp body through the visceral cavity along the path of said arcuate blade portion to a depth determined by the depth traversed by said lower second cutting edge, the lowermost teeth of said inclined intermediate toothed blade portion passing through the upper portion of said slit in said shrimp body and engaging and removing the vein in said visceral cavity as said toothed blade portion passes therethrough, said inclined cutting teeth further engaging the shell above said vertical slit in the shrimp body for raising and separating the shell from the shrimp body and then longitudinally cutting the shell in alignment with the longitudinal vertical slit made in the shrimp body by said knife blade for facilitating easy removal of the shell from the shrimp body.

14. The knife as described in claim 13, wherein said intermediate toothed blade portion is integral with said knife blade and lies in the plane of said knife blade.

15. The knife as described in claim 13, wherein said intermediate toothed blade portion is a separate piece overlying said knife blade adjacent said handle.

16. The knife as described in claim 15, wherein said intermediate toothed blade portion includes a sleeve section having an aperture therethrough for insertion over said knife blade and positionable thereon adjacent said handle, and means for retaining said removable intermediate toothed blade portion on said knife blade adjacent said handle.

17. The knife as described in claim 16, wherein said retaining means comprises a permanent means of mounting said sleeve portion to said knife blade.

18. The knife as described in claim 17, wherein said permanent means comprises a rivet disposed laterally through said sleeve section and said knife blade.

19. The knife as described in claim 16, wherein said retaining means comprises releasable means of mounting said sleeve section on said knife blade to facilitate removal of said sleeve section.

20. The knife as described in claim 19, wherein said releasable means comprises a snug friction fit of said sleeve section with respect to said knife blade.

21. The knife as described in claim 19, wherein said releasable means comprises a set screw disposed in said sleeve section for releasably engaging said knife blade.

* * * * *